V. TASCHL.
APPARATUS FOR AGITATING AND CONVEYING SETTLED STIFF MASSES, SUCH AS STARCH, CLAY, OR THE LIKE.
APPLICATION FILED JULY 9, 1912.

1,057,685.

Patented Apr. 1, 1913.

3 SHEETS—SHEET 1.

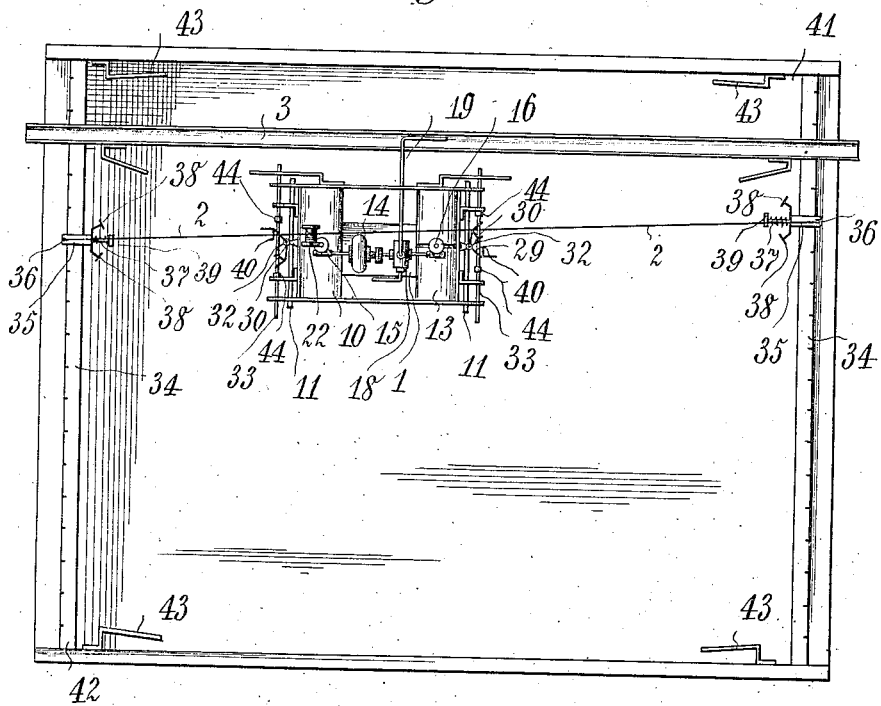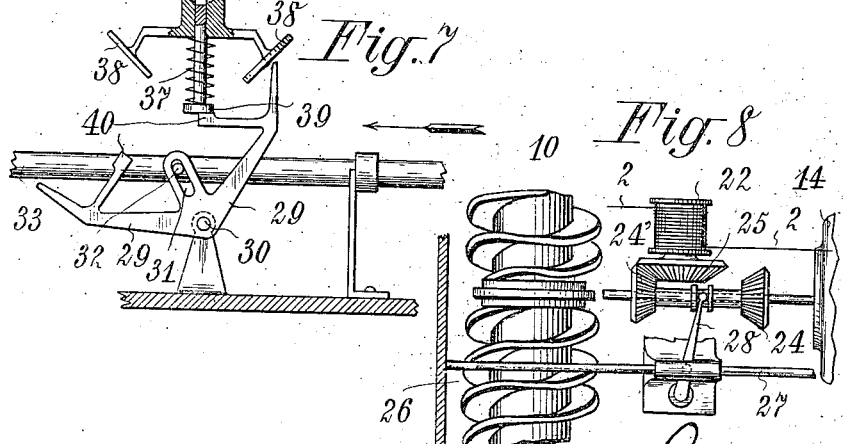

V. TASCHL.
APPARATUS FOR AGITATING AND CONVEYING SETTLED STIFF MASSES, SUCH AS STARCH, CLAY, OR THE LIKE.
APPLICATION FILED JULY 9, 1912.

1,057,685.

Patented Apr. 1, 1913.

3 SHEETS—SHEET 3.

UNITED STATES PATENT OFFICE.

VIKTOR TASCHL, OF WESSELY-ON-THE-MARCH, AUSTRIA-HUNGARY.

APPARATUS FOR AGITATING AND CONVEYING SETTLED STIFF MASSES, SUCH AS STARCH, CLAY, OR THE LIKE.

1,057,685.  Specification of Letters Patent.  Patented Apr. 1, 1913.

Application filed July 9, 1912. Serial No. 708,508.

*To all whom it may concern:*

Be it known that I, VIKTOR TASCHL, residing in Wessely-on-the-March, Moravia, Austria-Hungary, and a subject of the Emperor of Austria-Hungary, have invented new and useful Improvements in Apparatuses for Agitating and Conveying Settled Stiff Masses, Such as Starch, Clay, or the Like, of which the following is a full and clear specification.

The discharge channels, troughs or basins which are at the present time largely used in starch and earthenware manufacture are emptied or cleaned almost exclusively by hand.

The invention has for its object to replace this method of manual labor which requires from 3 to 6 men for each separate system of channels, by mechanical operation. In the description which follows for the sake of simplicity reference will be made to starch manufacture only as the manipulation in the earthenware industry is quite similar.

The method upon which the present invention is based consists in agitating the starch in the discharge channels in chambers closed by the apparatus by means of displaceable scraper mechanisms, in supplying water and in pumping off the starch solution. The apparatus rests on the bottom of the basin or on the starch and comprises one or more members which lift the stiff starch and agitate it and also devices for operating and controlling the apparatus in the trough and also members for conducting the starch solution from the space limited by the agitating members.

One form of the apparatus consists of two brush rollers rotatable against each other and which automatically move along a wire cable over the entire surface of the channel forward, backward and if desired also laterally, the stiff starch being agitated by means of a powerful jet of water and carried to a pump which raises the starch solution which is carried through small channels to a collecting vat.

Constructional forms of the apparatus are illustrated by way of example in the accompanying drawing, in which:—

Figure 1:
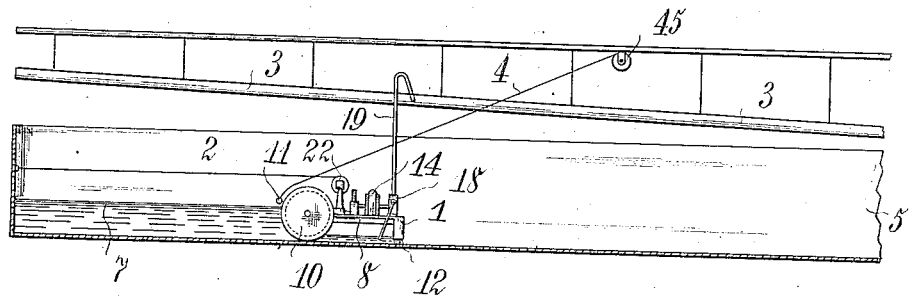
Figure 2:
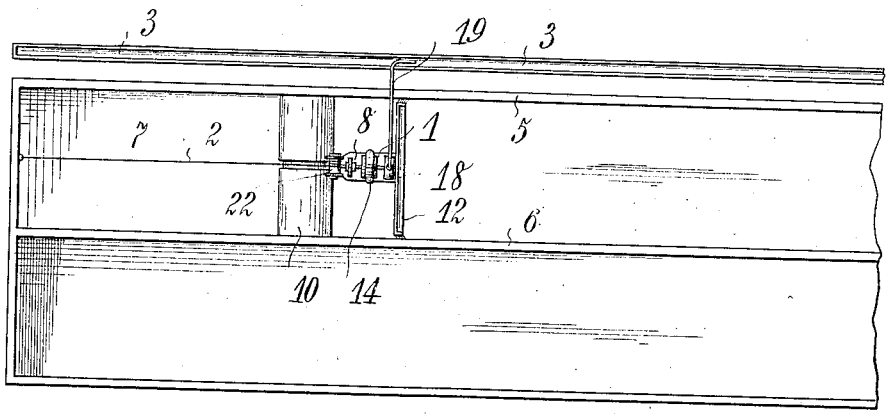
Figure 3:
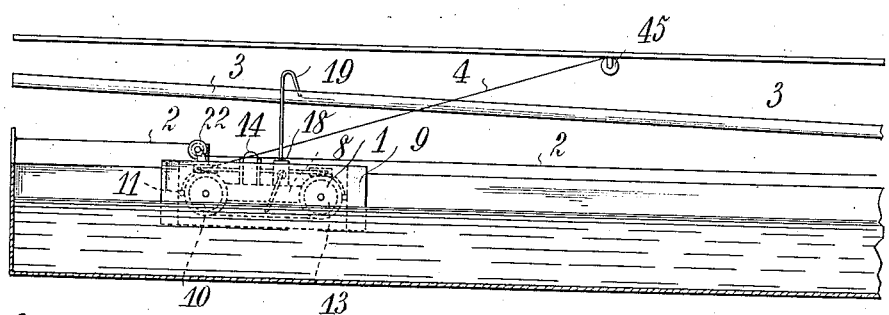
Figure 5:
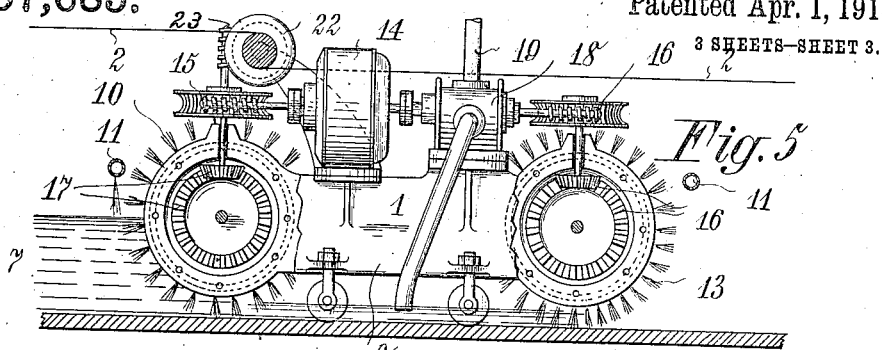
Figure 6:
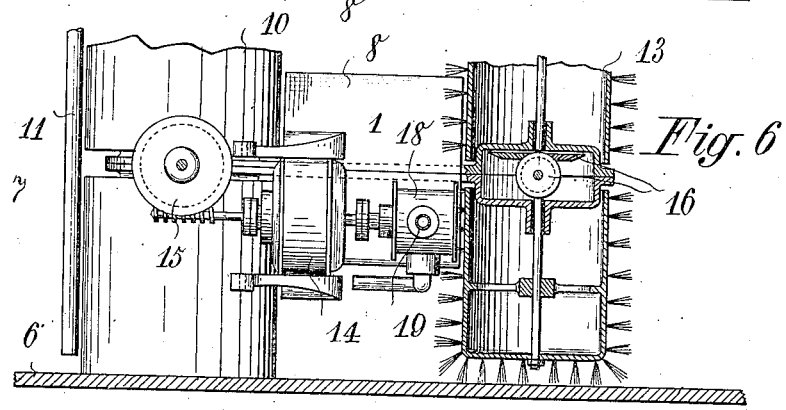
Figure 9:
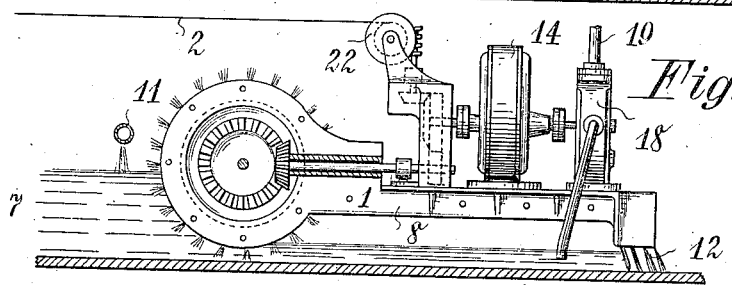
Figure 10:
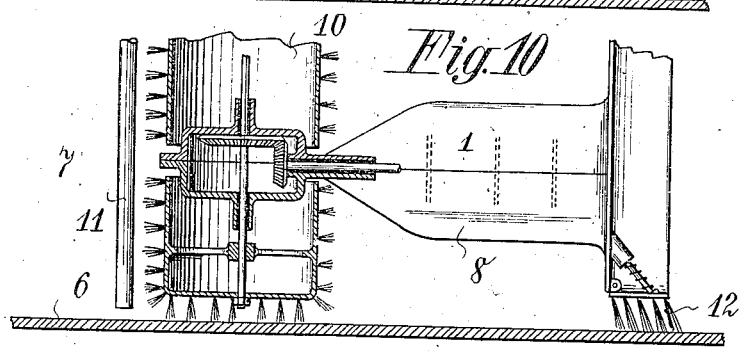

Figures 1 and 2 illustrate the apparatus for a narrow trough while Figs. 3 and 4 illustrate the arrangement for a wide basin. Figs. 5 and 6 show in longitudinal section and top view broken away a construction with two brush rollers rotating toward each other. Figs. 7 and 8 illustrate plan views, partly in section, of details of the control and Figs. 9 and 10 illustrate a second constructional form with a brush cylinder and a weir.

The apparatus consists broadly of the carriage 1 arranged in the trough and carrying scraping mechanism and provided with a drive; the wire cable 2 with driving mechanism, for the carriage, the discharge channel 3 for the starch solution and the water supply device 4.

The construction of the carriage varies with the discharge channel (basin or trough); in the case of narrow troughs (Figs. 1 and 2) it has the width of the trough and the walls 5 and 6 of the trough form the lateral limitations of the agitator chamber 7. In the case of a wide basin the carriage frame 8 comprises lateral closing walls 9 (Figs. 3 and 4). A brush cylinder 10, in two parts, is mounted in the frame 8 and in conjunction with a powerful jet, supplied through spraying tubes 11, serves for detaching the starch or the like and coöperating either with cross wall 12 or with a second brush cylinder 13 closes the agitator chamber 7 for the starch in the longitudinal direction.

While devices with pairs of brush cylinders are utilizable for forward and reversed movement both for narrow and for wide basins, apparatuses with cross walls are suitable for operation in one direction only, that is to say for narrow troughs. In the case of the cross walls the closure is obtained by brushes bearing on the bottom and sides, these brushes being preferably yieldingly pressed against the trough (Fig. 10).

The brush cylinders which act as scraping devices might also be replaced by worms or spirals as used with conveyers, as shown in Fig. 8.

The scraping devices are caused to rotate in opposite directions by a hydraulic or electric motor 14 or by a combustion engine. According to Fig. 5 the motor drives each brush cylinder through worm gear 15 and bevel wheels 16, 17 and also drives a rotary pump 18 which takes up the starch solution supplied to it by means of the brush cylinders and discharges it through the pipe 19 into the discharge channel 3.

The latter is either displaced by the workman or comprises inclined tappets 20 on the ends of the trough in which arms 21 of the vehicle engage at the end of the travel of the latter in order to obtain an automatic displacement of the discharge channel to the extent of one or several inches. The motor 14 is also used for driving the carriage owing to the fact that it rotates the drum 22 on which the wire cable 2 is wound. If the carriage is only to be drawn forward the wire cable fixed to one side of the trough is wound onto the drum when the latter rotates. If, however, the vehicle is to receive a forward and reverse movement the wire cable is fixed at each end of the trough, a few windings passing around the drum which alternately rotates in opposite directions. In accordance with Fig. 5 the drum is driven through worm gear 23. The drum can, however, be driven from the motor through bevel pinions for example (Fig. 8) which at the same time render it possible to reverse the direction of the movement owing to the fact that according as the wheel 24 or 24' is caused to engage with the bevel wheel 25, the drum is rotated in opposite directions. The reversal is effected by means of tappets 26 or 27, Fig. 8, for example which actuate the operating lever 28 of the bevel wheels when they strike against one or other end of the trough.

In order to obtain an automatic lateral displacement of the carriage in the case of wide basins, a lever 29 which is substantially V-shaped is fitted to the front and rear of the carriage. This lever is oscillated about the pivot 30, one of its arms always pointing in the direction of travel, and it is connected by the slotted arm 31, and bolt 32, with the operating rod 33. Furthermore at each end of the trough a notched rail 34 is arranged and on this rail a traveler or yoke piece 35 is readily displaceable. The end of the wire cable is fixed to this member 35 and it comprises a displaceable knife edged member 36 which engages notches under the action of the spring 37. The yoke piece also comprises two obliquely directed bearing faces 38 and an adjustable tappet 39 serving to support the spring 37 while each arm of the lever 29 is furnished with a striking arm 40.

When the carriage approaches the end of the trough in the first place the arm 40, of that arm of the lever which projects in the direction of the displacement, strikes against the disk 39 and shifts it endwise, whereby the knife edged member 36 is shifted from the notch and immediately thereafter the end of the projecting lever arm 29 presses against the inclined surface 38 causing lateral displacement of the yoke piece on the notched rail owing to which the plate 39 is shifted laterally off from the arm 40 so that the knife 36 is able to snap into the next notch in the rail. This causes the corresponding end of the cable 2 to be displaced automatically laterally. If the direction of rotation of the cable drum is then reversed (for example in the manner already described by the stop 26 or 27) in the succeeding return movement the carriage runs along the newly adjusted direction of the wire cable and in this manner in a number of strokes it will pass over the entire trough zig-zag fashion so that it passes for example from the right hand upper angle of the longitudinal wall 41 to the left hand angle of the longitudinal wall 42. In order to produce, automatically, a displacement in the opposite direction the wire cable anchor 35 must be shifted in the opposite direction along the notched rail 34. This is effected by means of the control rods 33 which strike against obliquely directed tappets 43 in the angles of the trough and produce oscillation of the slotted arm 31 and consequently of the V-shaped lever 29 so that the second arm of this lever is now able to coöperate with the other inclined face 38 and shifts the yoke piece 35 in the opposite direction. In the displacements of the control rods 33 tappets 44 (Fig. 4) serve to limit the movement of the rod.

In order that the supply of water for the spraying tube 11 may remain insured during the displacement of the carriage the water is supplied to it by means of a hose 4 which automatically winds onto and from a drum 45; the water is supplied to this hose from the exterior through the drum shaft.

Having now described my invention what I claim as new and ask to secure by Letters Patent is:

1. In an apparatus for agitating and conveying settled stiff masses comprising, a rotatable scraping device, a driving drum and a motor mounted upon a carriage, transmission means between the motor and the scraping device and the driving drum, a cable on the drum, the ends of the cable being anchored at the ends of a settling trough, a laterally movable traveler connected to the end of the cable, inclined striking surfaces on the traveler, and a shifting lever arranged on the carriage, substantially as described.

2. In an apparatus for agitating and conveying settled stiff masses comprising, a longitudinally movable carriage, carrying rotatable means for scraping and agitating the settled mass, a driving motor for the scraping means arranged upon the carriage, a cable drum located upon the carriage and driven by the said motor, a cable on the drum with its ends anchored to travelers at the ends of the settling trough, a notched rail carrying each traveler and oblique striking surfaces provided on the said traveler, a spring catch holding the traveler to the notched rail, a lever with two arms fitted to the front of the carriage pointing with one arm in the direction of travel, a striking arm upon each arm of the said lever, and means for oscillating the said lever with arms, and means for reversing the motion of the cable drum, substantially as described.

In testimony whereof I affix my signature in presence of two witneses.

VIKTOR TASCHL.

Witnesses:
 RICHARD KOMINIK,
 AUGUST FUGGER.